United States Patent [19]

Matsui

[11] 4,332,542

[45] Jun. 1, 1982

[54] ELECTRICALLY DRIVEN POTTER'S WHEEL

[75] Inventor: Norio Matsui, Kyoto, Japan

[73] Assignee: Shinpo Kogyo Kabushiki Kaisha, Kyoto, Japan

[21] Appl. No.: 256,573

[22] Filed: Apr. 22, 1981

[30] Foreign Application Priority Data

Apr. 23, 1980 [JP] Japan ................................ 55-53989

[51] Int. Cl.[3] ................................ B29G 7/00

[52] U.S. Cl. ................................ 425/459

[58] Field of Search ................................ 425/459, 268

[56] References Cited

U.S. PATENT DOCUMENTS 1,551,728 9/1925 Burger ................................ 425/268

*Primary Examiner*—John A. Parrish

*Attorney, Agent, or Firm*—Burns, Doane, Swecker & Mathis

[57] ABSTRACT

A potter's wheel includes a rotary molding table mounted on a casing. An inverted cup-shaped member is disposed in the casing and has a rubber ring along the inner surface of its lower edge. The cup-shaped member is connected to the table to drive the latter. A driving unit for driving the cup-shaped member includes a conical roller which is movable vertically within the cup-shaped member relative to the ring.

2 Claims, 5 Drawing Figures

ELECTRICALLY DRIVEN POTTER'S WHEEL

BACKGROUND AND OBJECTS OF THE INVENTION

Electrically driven potter's wheels are known which are provided with a driving unit consisting of an electric motor and a conical roller directly coupled to the electric motor. In one known type a rim wheel on the table shaft is driven directly by the roller of the driving unit, and in another known type a belt is hung between a pulley on the table shaft and a pulley driven by the driving unit so that the speed is also reduced by the pulley-driving-part. The former will be called "direct driving type" and the latter will be called "belt driving type" or "reduction-driving type". They both have merits and disadvantages as follows:

(1) Directing Driving Type:

In this type the rim wheel on the shaft of the molding table is driven by a roller which is directly coupled with an electric motor. That driving unit comprising the roller and the electric motor is moved in a horizontal direction to vary the speed of the molding table. Since the speed is not reduced by a belt-and-pulley-device, the roller of the driving unit must drive the rim wheel on the molding table under a relatively large contact pressure. Therefore, the wear and fatigue of the rubber ring on the rim wheel are so large as to shorten the life of the potter's wheel. On the other hand, the structure of this potter's wheel is remarkably simplified, and further, the overall size of the potter's wheel becomes small, taking-on a compact construction.

(2) Belt Driving Type (Reduction Driving Type):

Since the speed is reduced by the belt-and-pulley-device, the roller of the driving unit can drive the follower wheel under a relatively small contact pressure. Therefore, the wear of the rubber ring on the follower wheel is small and the life of the potter's wheel is long. But, on the other hand, the construction is comparatively complicated, the number of component parts is large and the lengthwise dimension is large. Further, this type of potter's wheel often causes noise and vibration due to an irregular wear of the belt.

Although each of the above-two types of electrically driven potter's wheels are known, in most cases potter's wheels of the belt driving type are used since the life of this type is longer than that of the direct-driving type.

One object of the present invention is to provide an electrically driven potter's wheel of the direct driving type of simple construction, small size and low price which is not accompanied with the disadvantage of short life.

SUMMARY OF THE INVENTION

The potter's wheel according to the present invention is characterized in that, a cup-shaped member having a large depth is fitted with a rubber ring along the inner surface of its open side portion. This member is fixed to a shaft of the molding table (turn table). A conical roller is directly coupled to an electric motor and frictionally engages the rubber ring. A speed changing mechanism moves the conical roller in a nearly vertical direction relative to the ring to vary its effective contact radius.

THE DRAWINGS

The construction and the advantages will be concretely explained in the following description referring to the drawings in which.

DETAILED DESCRIPTION OF A PREFERRED EMBODIMENT OF THE INVENTION

Figure 1:
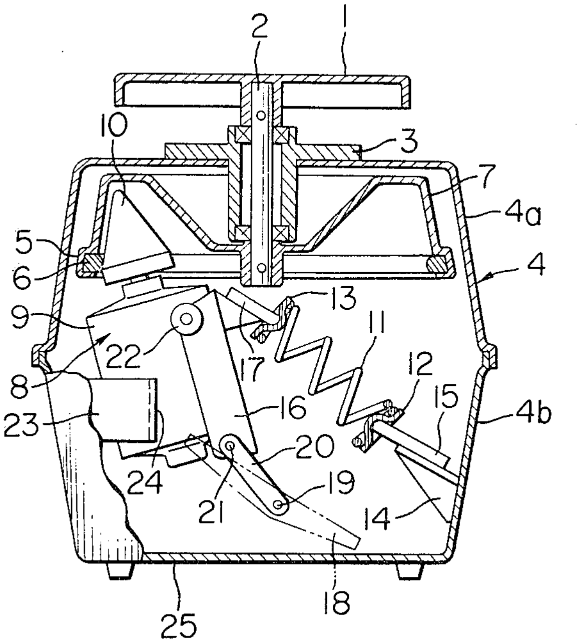
FIG. 1 is a vertically sectioned view of the potter's wheel according to the present invention.

In FIG. 1 there is depicted a molding table 1, its shaft 2, and a bearing housing 3 containing bearings of the shaft of the molding table. A casing 4 of the potter's wheel comprises an upper casing **4*a* and a lower casing 4*b*. A downwardly open (inverted) cup-shaped member 7 relatively long in depth and fitted with a resilient ring 6 (e.g., a rubber ring) along an inner periphery of a lower edge portion 5 of a generally cylindrical wall of the member 7 is fixed to the shaft 2 of the molding table 1. A driving unit 8 comprises an electric motor 9, and a conical roller 10 coupled directly to the electric motor 9 in the sense that no speed reduction mechanism is connected therebetween. A spring 11 generates contact pressure between the conical roller 10 and the rubber ring 6. The spring 11 is a coil compression spring element interposed between the lower casing 4*b* and the electric motor 9. A pair of spring seats 12, 13 receive ends of the spring 11, one spring seat 12 being pivotally engaged with a rod 15 made integral with a bracket 14 on the lower casing 4*b*, and the other spring seat 13 being pivotally engaged with a rod 17 made integral with a bracket 16 on the electric motor 9**.

Figure 2:
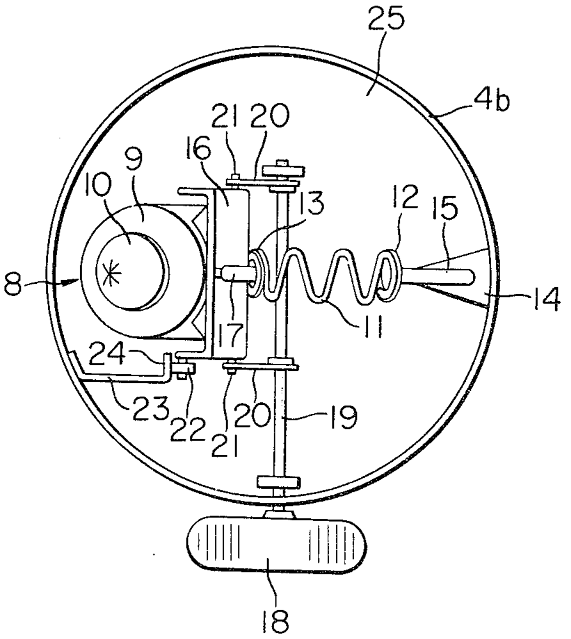
FIG. 2 is a plan view wherein the upper casing is removed to show a contact pressure generating means and a speed-changing means.

A pedal 18 is provided for a speed changing operation. A speed changing shaft 19 is made integral with the pedal 18. An arm 20 extends from the speed changing shaft 19 so as to rotate by an amount equal to the amount of rotation of the pedal 18 about an axis defined by the shaft 19. A speed changing device comprising the pedal 18, the shaft 19 and the arm 20 is connected to the bracket 16 on the electric motor 9 through a pin 21. FIG. 2 is a plan view with the upper casing **4*a* removed, showing the relation between the speed changing device, the spring 11, and the electric motor 9**.

In order that the conical roller 10 can be smoothly engaged with and smoothly disengaged from the rubber ring 6 on the driven cup-shaped member 7, a roller 22 is mounted on the bracket 16 on the electric motor 9, and a seat 23 is provided on the side wall of the lower casing **4*b* (see FIGS. 1 and 2). This seat 23 has a receiving surface 24 with which the roller 22** engages and disengages.

A bottom wall 25 is provided on the lower casing **4*b* and it contributes to increase the rigidity of the casing 4 formed in cooperation with the upper casing 4*a***.

The potter's wheel is assembled by placing an upper assembly consisting of the upper casing **4*a* and the parts belonging to it onto a lower assembly consisting of the lower casing 4*b* and the parts belonging to it, and by interconnecting these assemblies by bolts. The lower assembly has the respective parts belonging to it assembled, with the driving unit 8** placed lowermost.

Figure 3:
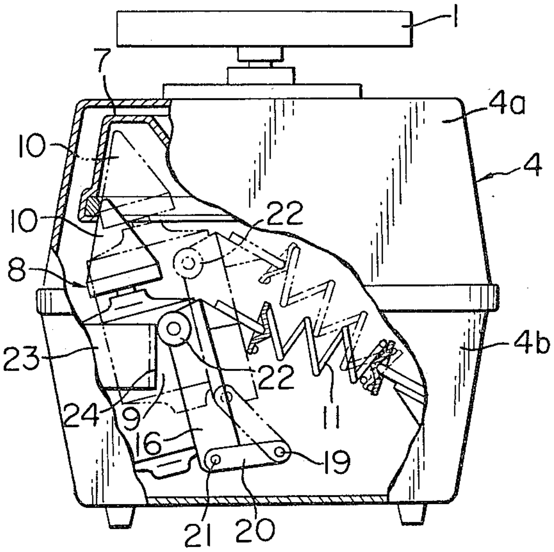
FIG. 3 is a view showing the potter's wheel of FIG. 1 in two operating modes.

The contact pressure generated between the conical roller 10 and the rubber ring 6 by the spring 11 interposed between the lower casing 4*b* and the electric motor 9 increases as the conical roller 10 approaches the position shown by solid lines in FIG. 3 in a direction away from the highest position shown by the broken lines in FIG. 3 (the spring extends as the roller rises). The rate of increase of the contact pressure becomes higher as the effective radius of the conical roller 10 at the contact point becomes smaller, due to the relation between the direction of the center line of the spring 11 and the direction of the center line of the driving unit 8.

The spring 11 not only generates contact pressure under a preferable condition between the conical roller 10 and the rubber ring 6 as explained, but also counterbalances or nearly counterbalances the electric motor 9 so that the speed-changing operation can be carried out smoothly by a small operating force.

Figure 4A:
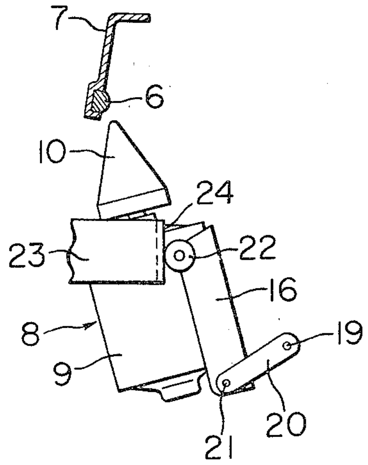
FIGS. 4*a* and 4*b* are fragmentary views showing two positions of a driving unit consisting of a conical roller and an electric motor.
Figure 4B:
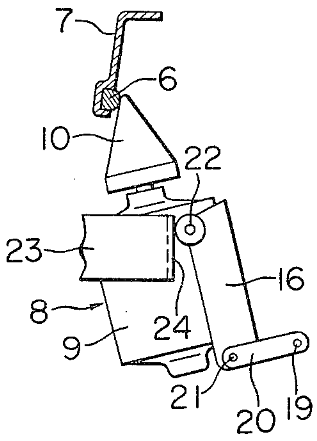

The interactions of the receiving seat 23 on the lower casing 4*b* and the roller 22 on the electric motor 9 are illustrated in FIGS. 4*a* and 4*b*. Of these drawings, FIG. 4*a* shows the conical roller 10 as completely disengaged with the rubber ring 6. In this state, all the force exerted by the spring 11 is resisted by the surface 24 on the receiving seat 23 and the cup-shaped member 7 (and therefore the molding table 1) is fully disengaged with the driving unit. This state is adapted for picturing and centering operations. FIG. 4*b* shows the conical roller 10 as it rises and begins to engage the rubber ring 6. In this state, the greater part of the force exerted by the spring 11 is resisted by the receiving surface 24 on the receiving seat 23. When the conical wheel 10 is further raised beyond the state shown in FIG. 4*b*, there occurs a "transitional state" wherein the force acting between the receiving surface 24 and roller 22 decreases, while the contact pressure acting between the rubber ring 6 and the conical roller 10 increases. When the roller 22 leaves the receiving surface 24, the conical wheel 10 will forcibly drive the cup-shaped member 7 without any accompanying slippage.

It has been pointed out concerning the conventional direct driving type of potter's wheel that, as the driving roller must transmit power while being subjected to a high contact pressure, the wear and fatigue of the rubber ring on the driven wheel frictionally engaged with the driving roller are so large as to produce problems in respect to its life span. However, these are problems due to the following circumstances:

(1) The conical roller is conventionally coupled directly to an induction motor rotated at 1500 or 1800 revolutions per minute. Since there is a speed range (for example 30 to 250 rpm) required for the pottery operation, the rotating speed of the conical roller must be reduced to this speed range.

(2) If there are no restrictions about the dimensions of various parts forming the driving system, the speed reduction ratio required to impart the speed range of 30 to 250 rpm to the molding table can possibly be achieved without the occurrence of the abovementioned problem of wear and fatigue, while adopting the conventional potter's wheel structure. However, ignoring such restrictions is to forsake the abovedescribed merits of the direct driving type (especially compactness) and therefore cannot be allowed.

It will be appreciated that according to the present invention, the cup-shaped member 7, long in depth is made a driven wheel for the conical roller. The speed is changed by varying the amount of entry of the conical wheel into the space within the cup-shaped member, and the cup-shaped member 7 is driven by the conical roller. If this potter's wheel arrangement with a vertically moving conical roller occupies a floor area equal to the floor area occupied by a conventional kind of potter's wheel (in which the conical roller is moved horizontally to change speed), there will exist more space, thus enabling the driven cupshaped member to have a diameter larger than that of the conventional driven wheel. As a result, the predetermined speed reduction ratio, as well as the size of the conical roller will be necessarily large. (On the contrary, when a relatively small driven wheel is used, a relatively small driving roller must be used to obtain a required speed range.) It is a primary factor in improving the frictional engagement between the conical roller and the rubber ring that a larger conical roller can be used. This primary factor, together with the improvement wherein the driving between the conical roller and the rubber ring is an internal drive (frictional engagement of convex surface to concave surface), makes the potter's wheel according to the present invention long in life even though it is a direct-drive type.

Also, the driving unit, contact pressure generating device and speed changing device can be housed in a relatively small casing, while significantly decreasing the number of components extremely. Further, in the case of the potter's wheel according to the present invention, shifting from the non-driven state of the cup-shaped member to the forced driving state of the cup-shaped member (and vice versa) can be carried out very smoothly.

Although the invention has been described in connection with a preferred embodiment thereof, it will be appreciated by those skilled in the art that additions, substitutions, modifications, and deletions not specifically described, may be made without departing from the spirit and scope of the invention as defined in the appended claims.

What is claimed is:

1. An electrically driven potter's wheel comprising:

a rotary molding table having a drive shaft, a generally cup-shaped member being generally downwardly open and having a resilient ring along an inner surface of its lower edge, said member being rotatably mounted and fixed to said shaft, an electric motor, a conical roller directly coupled to said electric motor and arranged to frictionally engage said ring to drive said table, and speed-changing means for moving said conical roller in a generally vertical direction relative to said ring to vary the effective contact radius of said roller.

2. An electrically driven potter's wheel comprising:

a casing, a molding table rotatably mounted to said casing and having a drive shaft, a generally cup-shaped member being generally downwardly open and having a resilient ring along an inner surface of its lower edge, said member being rotatably mounted on said casing and fixed to said shaft, drive means comprising:

an electric motor, a conical roller directly coupled to said electric motor and arranged to frictionally engage said ring to drive said table, a speed changing shaft rotatable by a user of the potter's wheel, and an arm extending from said speed changing shaft and connected pivotably to said electric motor to displace the latter generally vertically relative to said ring when said speed changing shaft is rotated, a spring operably disposed between said electric motor and said casing for generating contact pressure between said ring and said conical roller, and a seat provided on the side wall of said casing to bear against all of the force of said spring in a state wherein said drive means is sufficiently lowered to enable said molding table can be turned freely in independently of said drive means, said force acting on said seat being decreased in the course of raising of said drive means from maximum to zero by the frictional engagement between said conical roller and said ring which occurs gradually increasing contact pressure from zero to maximum.

* * * * *